June 5, 1962  J. W. HOLLOWAY  3,037,326
METHOD AND APPARATUS FOR PROVIDING CONDUITS
IN MOLDED CONCRETE SLABS
Filed Dec. 23, 1957  2 Sheets-Sheet 1
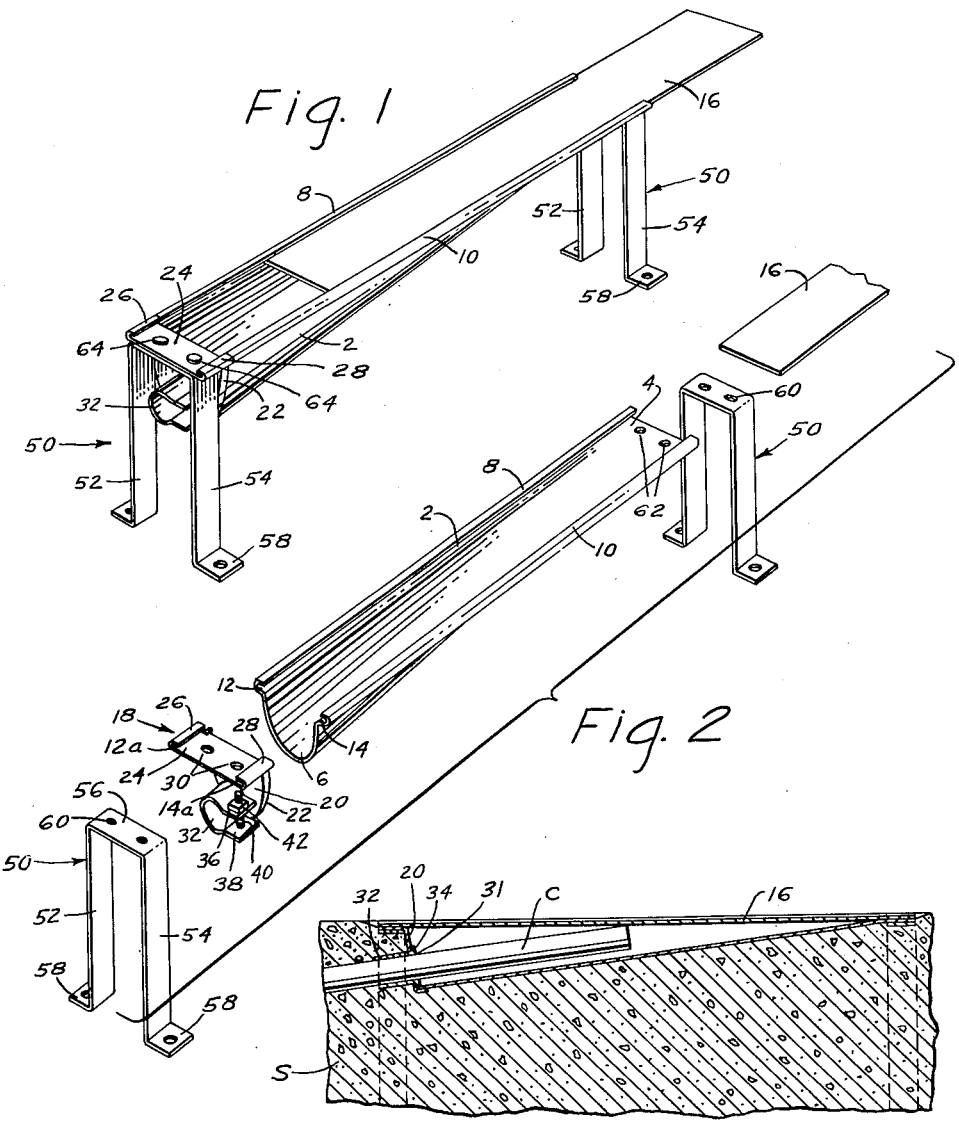
INVENTOR.
JOHN W. HOLLOWAY
BY Elliot A. Salter June 5, 1962  J. W. HOLLOWAY  3,037,326
METHOD AND APPARATUS FOR PROVIDING CONDUITS
IN MOLDED CONCRETE SLABS
Filed Dec. 23, 1957  2 Sheets-Sheet 2

INVENTOR.
JOHN W. HOLLOWAY
BY Eliot A. Salter

United States Patent Office 3,037,326
Patented June 5, 1962

3,037,326
METHOD AND APPARATUS FOR PROVIDING CONDUITS IN MOLDED CONCRETE SLABS
John W. Holloway, Cranston, R.I.
(59 Homewood Ave., North Providence, R.I.)
Filed Dec. 23, 1957, Ser. No. 704,698
2 Claims. (Cl. 50—127)

This invention relates primarily to the "lift-slab" method of constructing buildings and more particularly to a method and apparatus for embedding conduits in concrete slabs and for bending the ends of embedded conduits away from the plane of the cast slabs.

As is well known to persons skilled in the art, in the lift-slab method of construction, floors, and even walls, are cast one on top of the other on the ground, and then they are lifted into place by hydraulic jacks. To further facilitate construction, heating and water pipes and electrical conduits are embedded in the slabs, and when the slabs have been lifted into place the various pipe lines and conduits are connected up. Heretofore, the pipes for conduits have been bent up at their ends and couplings have been applied thereto before pouring the slab. In order to permit several slabs to be cast one on top of the other, it has been necessary to cut the end of the pipe or conduit so that the coupling would be flush with the surface of the slab. This method has several disadvantages. One disadvantage is that it is difficult to bend the pipe near its end. Another disadvantage is that if the pipe is not bent properly the coupling will not be positioned in the correct spot, and if the coupling is out of place or does not project up at a right angle to the plane of the slab, it is difficult to connect the embedded conduit or pipe to other conduits or pipes. A further disadvantage is that the end of the pipe or conduit must be cut so that the coupling will be flush with the top surface of the slab and not project above the slab. Another disadvantage is that special provision must be made to prevent the concrete mix from covering or running into the coupling; otherwise the concrete will block up the pipe or conduit.

Accordingly, the object of the present invention is to provide a novel method and apparatus for embedding conduits and pipes in concrete slabs without the disadvantages and difficulties heretofore incurred.

Another specific object is to provide a novel apparatus for supporting a conduit for embedment in a concrete slab and for bending the ends of the conduit away from the plane of the slab after the slab has been cast.

A further object is to provide a novel method of concealing conduits cast into lift slabs and for bending the ends of the conduits outwardly away from the slabs so as to permit the conduits to be connected to other conduits.

Other objects and many of the attendant advantages of the present invention will become readily apparent as reference is had to the following detailed description when considered together with the accompanying drawings wherein:

FIG. 1 is a perspective view of novel apparatus for supporting and concealing the end of the conduit to be embedded in a concrete slab;

FIG. 2 is a perspective view similar to FIG. 1 with the several parts of the apparatus shown in exploded or separated relation;

FIG. 3 is a fragmentary vertical section of a concrete slab in which is embedded the apparatus of FIG. 1 in supporting relation with the end of an embedded conduit, the section being taken through the center of said apparatus;

Figure 4:
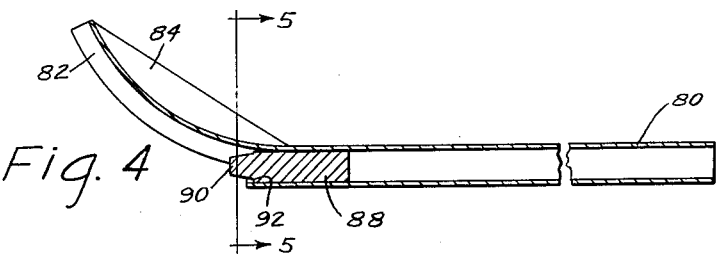
FIG. 4 is a vertical section taken along the longitudinal center line of a novel bending tool employed with the apparatus of FIG. 1 for bending the end of an embedded conduit away from the plane of the concrete slab.
Figure 5:
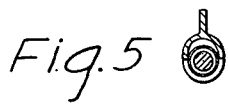
FIG. 5 is a vertical cross section taken along line 5—5 of FIG. 4.

Referring now to FIGS. 1 and 2, the apparatus for supporting the end of a conduit to be embedded in a concrete slab comprises a trough or channel 2 formed from sheet metal. The trough 2 increases in depth from its upper end 4 to its lower end 6, and its outline in cross section also varies, being flat at its end 4 and substantially semi-cylindrical at its other end 6. The longitudinal edges 8 and 10 of the trough are folded back upon themselves to form longitudinally extending grooves or channels 12 and 14 that face each other and are adapted to slidably receive the opposite edges of a slat or cover member 16.

An end member or cover indicated generally by the numeral 18 is provided for the curved or dished end 6 of the trough. The end member 18 is also formed of sheet metal and comprises a semi-circular plate 20 provided along its curved edge with a rearwardly extending peripheral flange 22. At its straight upper edge plate 20 is provided with a forwardly extending flat flange 24, the opposite edges 26 and 28 of which are bent back upon themselves to form longitudinally extending channels 12a and 14a adapted to be aligned with aforementioned channels 12 and 14 for slidably receiving the opposite edges of slat 16. Flange 24 is provided with a pair of holes 30 for a purpose hereinafter identified. The semi-circular plate 20 is also provided with a central opening 31 in which is received a split sleeve 32. One end of sleeve 32 is provided with a peripheral flange 34 which abuts against the rear surface of plate 20. The split sleeve 32 is also provided with two flanges 36 and 38, said flanges being provided with openings to accommodate a screw 40 provided with a nut 42.

End member 18 is positioned up against the trough 2, with the edge of the trough at its end 6 being surrounded and supported by the flange 22. In practice, flange 22 is spot-welded to the trough 2, and preferably, split sleeve 32 is welded to the edge of opening 31.

The foregoing assembly is supported by two bracket members generally identified by the numeral 50. These bracket members comprise a pair of legs 52 and 54 joined at their upper ends by a horizontal connecting portion 56. The legs are provided at their bottom ends with feet 58. The connecting portion 56 is provided with a pair of holes 60. The end 4 of the trough is also provided with a pair of holes 62. Holes 62 and also the holes 30 and the end member 18 are spaced so as to be aligned with the holes 60 in the bracket members 50 whereby rivets 64 may be employed to secure the supporting brackets to the trough assembly.

FIG. 3 illustrates how the apparatus of FIGS. 1 and 2 is employed.

When a concrete slab is to be poured with a conduit embedded therein, the first step is to take a conduit C and to bend it adjacent its end so that the end of the conduit will be inclined at an angle substantially corresponding to the angle of inclination of the trough 2 when the upper edges 8 and 10 of the trough are disposed in a horizontal plane. It is to be noted that the brackets 50 are adapted to support the opposite edges 8 and 10 of the trough in a horizontal plane when the feet 58 of these brackets rest on a horizontal platform, plate or slab. Assuming that a conduit C has been bent as described above, the trough assembly of FIG. 1 is brought in line with the end of the conduit and slipped over the end of the conduit. This is done by passing the conduit through the split sleeve 32. The trough and conduit are adjusted so that the end of the conduit is at a level just below the level of the channels 12 and 14, and with the channel and trough so positioned, the nut 42 is tightened so as to fixedly secure the sleeve to the conduit. Thereafter, the slat 16 is slid into place. It is to be noted that when the slat 16 is attached to the trough, it will extend beyond the end 6 of the trough and will run over the plate 24 of the end member 18. In this position, the slat prevents concrete mix from running into the trough. Thereafter the concrete mix is poured until it reaches the level of the edges 8 and 10 of the trough. The concrete mix is leveled off flush with the top of the trough and then allowed to set. After the concrete has hardened, the slat 16 is removed. Should some difficulty be incurred in sliding the slat out of the channels 12 and 14, the slat can, nevertheless, be removed by punching a hole in it and by inserting into the opening a pair of sheet metal shears. The shears can then be used to slit the slat longitudinally, after which the two halves of the slat can be removed without difficulty. Once the slat has been removed, the end of the pipe or conduit can be bent up away from the slab.

Although it is preferred to slidably mount the slat 16 as above described, it will be understood that if desired the slat could simply be spot-welded to the top edges of trough 2 and then torn away when it becomes necessary to gain access to the conduit end.

FIGS. 4 through 7 illustrate a novel tool for bending the end of the conduit away from the plane of the slab, as well as the manner in which the tool is employed. The bending tool is formed from tubular stock as, for example, a short length of steel pipe, and comprises a handle 80 provided at one end with a pipe-bending section 82. In practice the pipe-bending section 82 is formed by removing a half or semi-cylindrical section from one end of the pipe and by bending the remaining half section into an upwardly extending regular curve. The curved semi-cylindrical pipe-bending section 82 is reinforced by a web or rib 84, which is secured to the handle 80 and to the pipe-bending portion 82 by welding. A cylindrical plug 88 is fixedly secured within the end of the tubular handle 80. The plug 88 is provided with a reduced tapered end 90 having an annular shoulder 92 at the inner end of the tapered portion. It is to be noted that the interior diameter of handle 80 is slightly greater than the exterior diameter of the conduit C whose end is to be bent. Similarly, for all or almost all of its length, the tapered end 90 has a diameter less than the interior diameter of the conduit C. The shoulder 92 functions as a stop for the end edge of the conduit C when the tapered end 90 of plug 88 has a maximum diameter less than the interior diameter of the conduit to be bent.

Figure 6:
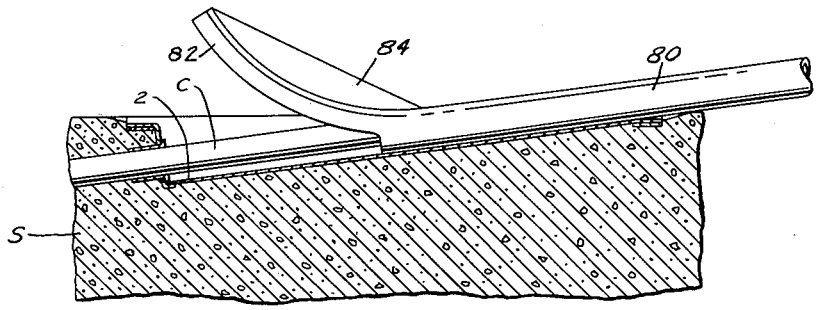
FIG. 6 is a fragmentary vertical section similar to FIG. 3 showing how the tool of FIG. 4 is applied to the end of the embedded conduit.
Figure 7:
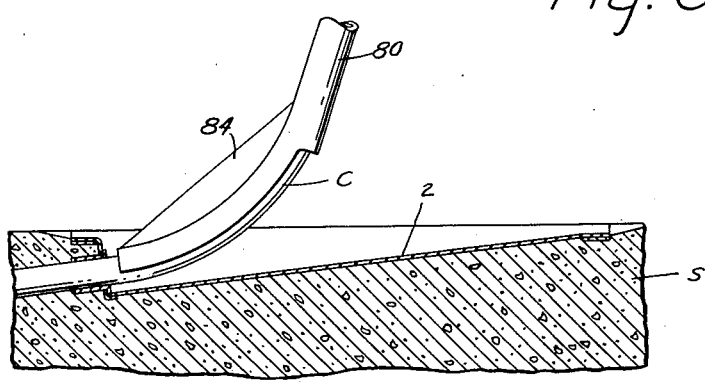
FIG. 7 shows how the bending tool is employed to bend the end of the conduit away from the cast slab.

Assuming that slab S has been cast and hardened and that slat 16 has been removed, bending of the end of conduit C is effected by inserting the tapered end of plug 88 into the end of the conduit as shown in FIG. 6. Since the trough is inclined to the plane of the slab, the free end of the tool handle will be spaced from the surface of the slab, permitting the handle to be grasped easily by the operator. Once the tool has been set in place, the operator pulls it away from the slab, causing the conduit to bend as shown in FIG. 7. The bending portion 82 of the tool bears against the conduit and causes it to assume a regular curve free from kinks or irregular bends. When the conduit has been bent to the desired angle (usually 90 degrees), the tool is removed, leaving the end of the conduit free to be connected as desired.

The apparatus of FIG. 1 may be made of materials other than steel. Thus, for example, the entire assembly or part of it may be made from suitable rigid or semi-rigid plastics. The important thing to consider is that the assembly provides a shelter for the end of a conduit so that the concrete mix will not cover that end. In addition, the trough assembly acts to align the conduit so that the end of the conduit will extend at an inclined angle to the slab. This is important since it permits the bending tool to be inserted without difficulty.

By using two devices like those of FIG. 1, one at each end of the conduit, it is possible to set the conduits in place before the slab is poured rather than while the pouring is taking place. Where the conduit is supported at both ends, it may be disposed at the correct level between the top and bottom surfaces of the slab to be cast.

Another advantage of the device of FIG. 1 is that it makes it possible to properly locate the conduit so that when its ends are bent up they will be in exactly the right spots. This is because the trough will shelter only a predetermined portion of the conduit, so that bending of the conduit by the bending tool will occur at a given distance from the end of the conduit. Accordingly, the position of the trough will locate the position where the end of the conduit will project up out of the slab.

Where several slabs are poured one on top of the other, bending of the conduits embedded therein will be effected only after all of the slabs above the conduits in question have been lifted and locked in place. Bending of the conduits in a given slab may be accomplished while the slab is still on the ground or after it has been lifted.

While this specification sets forth in detail a preferred form of the invention, it is readily apparent that modifications and variations of the present invention are possible in the light of the specification. Therefore, it is to be understood that the invention is not limited in its application to the details specifically illustrated or described and that within the scope of the appended claims it may be practiced otherwise than as specifically illustrated or described.

I claim:

1. In a building construction, a concrete slab having an upper surface, an elongated trough embedded in said slab and being defined by a channel portion that is semi-circular in cross section at one end thereof and that inclines upwardly toward the other end thereof terminating in a flat portion, the longitudinal edges of said channel portion being substantially coplanar and being located in substantially the same plane as the upper surface of said slab, an end wall connected to the semi-circular shaped end of said channel portion and having an opening therein, a conduit embedded in said slab extending through said opening and having a free end terminating in said channel portion and being angularly disposed with respect to the slab surface and parallel to the lower surface of said channel, and a removable cover enclosing said elongated trough and said conduit therein, wherein when said cover is removed, the end of said conduit that is located in said channel portion is exposed and is accessible for being bent outwardly from said slab.

2. In a building construction, a concrete slab having an upper surface, an elongated trough embedded in said slab and defining a channel portion, the longitudinal edges of which are substantially coplanar and are located in substantially the same plane as the upper surface of said slab, the bottom of said channel portion being inclined toward the upper surface of said slab whereby said channel portion is of gradually decreasing depth from its lower end to its upper end, said upper end terminating at said slab upper surface, an end wall connected to the lower end of said channel portion and having an opening therein, a conduit embedded in said slab extending through said opening and having a free end terminating in said channel portion and being angularly disposed with respect to said slab upper surface and substantially parallel to the bottom of said channel portion, and a removable cover spanning said longitudinal edges so as to enclose said channel portion and the conduit therein, whereby when said cover is removed, the end of said conduit that is located in said channel portion is exposed and is accessible for being bent outwardly from said slab.

(References on following page)

References Cited in the file of this patent

UNITED STATES PATENTS

| | | | |
|---|---|---|---|
| 263,046 | Huth | Aug. 22, | 1882 |
| 625,984 | Parks | May 30, | 1899 |
| 1,074,718 | Hibbs | Oct. 7, | 1913 |
| 1,394,002 | Goldsmith | Oct. 18, | 1921 |
| 1,430,931 | Blackall | Oct. 3, | 1922 |
| 1,570,448 | Musgrave et al. | Jan. 19, | 1926 |
| 1,765,460 | Siebs | June 24, | 1930 |
| 1,845,760 | Murray | Feb. 16, | 1932 |
| 1,994,113 | Sargent | Mar. 12, | 1935 |
| 2,081,197 | Goeller | May 25, | 1937 |
| 2,246,028 | Woodring | June 17, | 1941 |
| 2,271,798 | Lewin | Feb. 3, | 1942 |
| 2,334,779 | Luff | Nov. 23, | 1943 |
| 2,681,495 | Killian | June 22, | 1954 |
| 2,765,511 | Greene | Oct. 9, | 1956 |
| 2,775,017 | McDonough | Dec. 25, | 1956 |
| 2,780,121 | White | Feb. 5, | 1957 |
| 2,799,431 | Bush | July 16, | 1957 |
| 2,812,654 | Hoseason | Nov. 12, | 1957 |
| 2,817,986 | Benfield | Dec. 31, | 1957 |
| 2,898,759 | Pebley | Aug. 11, | 1959 |

FOREIGN PATENTS

| | | | |
|---|---|---|---|
| 228,740 | Great Britain | Feb. 12, | 1925 |